United States Patent
Lin

(10) Patent No.: US 9,866,704 B2
(45) Date of Patent: Jan. 9, 2018

(54) LINE DIGITAL SIGNAL PROCESSING DEVICE AND METHOD

(71) Applicant: Huawei Technologies Co., Ltd., Shenzhen (CN)

(72) Inventor: Liankui Lin, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/053,337

(22) Filed: Feb. 25, 2016

(65) Prior Publication Data

US 2016/0173698 A1  Jun. 16, 2016

Related U.S. Application Data

(63) Continuation of application No. PCT/CN2013/082286, filed on Aug. 26, 2013.

(51) Int. Cl.
*H04M 11/00* (2006.01)
*H04M 11/06* (2006.01)

(52) U.S. Cl.
CPC .......... *H04M 11/06* (2013.01); *H04M 11/062* (2013.01)

(58) Field of Classification Search
None
See application file for complete search history.

(56) References Cited

U.S. PATENT DOCUMENTS

| 7,092,412 | B1* | 8/2006 | Rezvani | H04L 27/2608 370/235 |
| 2003/0137973 | A1 | 7/2003 | Kim et al. | |
| 2005/0220120 | A1* | 10/2005 | Klausberger | H04L 12/2881 370/395.53 |
| 2007/0263651 | A1 | 11/2007 | Novotny et al. | |

FOREIGN PATENT DOCUMENTS

| CN | 1427610 A | 7/2003 |
| CN | 2645351 Y | 9/2004 |
| CN | 1783855 A | 6/2006 |
| WO | 2004093402 A1 | 10/2004 |
| WO | 2008115161 A2 | 9/2008 |
| WO | 2013072776 A2 | 5/2013 |

OTHER PUBLICATIONS

Foreign Communication From a Counterpart Application, European Application No. 13892683.7, Extended European Search Report dated Jul. 29, 2016, 9 pages.

(Continued)

*Primary Examiner* — Maria El-Zoobi
(74) *Attorney, Agent, or Firm* — Conley Rose, P.C.

(57) ABSTRACT

A line digital signal processing device and method. The device includes at least two line accessors and a data processor, where the at least two line accessors are connected to the data processor and each line accessor is not provided with line digital signal processing, and the data processor simultaneously performs line digital signal processing and service data recovery on service data sent by the at least two line accessors, thereby reducing complexity of an access device, and monitoring, maintenance, and alarming are simultaneously performed on complex line digital signal processing components.

10 Claims, 6 Drawing Sheets

(56) References Cited

OTHER PUBLICATIONS

Foreign Communication From a Counterpart Application, Chinese Application No. 201380001089.7, Chinese Office Action dated May 20, 2015, 5 pages.

Foreign Communication From a Counterpart Application, PCT Application No. PCT/CN2013/082286, English Translation of International Search Report dated May 8, 2014, 2 pages.

Foreign Communication From a Counterpart Application, PCT Application No. PCT/CN2013/082286, English Translation of Written Opinion dated May 8, 2014, 7 pages.

* cited by examiner

LINE DIGITAL SIGNAL PROCESSING DEVICE AND METHOD

CROSS-REFERENCE TO RELATED APPLICATIONS

This application is a continuation of International Application No. PCT/CN2013/082286, filed on Aug. 26, 2013, which is hereby incorporated by reference in its entirety.

TECHNICAL FIELD

The present disclosure relates to the field of communications technologies, and in particular, to a line digital signal processing device and method.

BACKGROUND

A copper wire access technology refers to a technology that uses an existing phone line as a transmission medium and connects a subscriber line to a network using a copper wire in order to implement service data exchange between a subscriber line and a network. In the copper wire access technology, various advanced modulation technologies, encoding technologies, and line digital signal processing technologies are used to increase a transmission rate and a transmission distance of the copper wire.

Currently, existing manners of copper wire access between a subscriber line and a network include plain old telephone service (POTS), asymmetric digital subscriber line (ADSL), very-high-bit-rate digital subscriber loop (VDSL), VDSL vectoring, G.fast, and the like. Forms of a copper wire access device are usually classified into a frame-type device, a box-type device, and an integrated device.

FIG. 1 is a schematic structural diagram of a frame-type copper wire access device. The device includes a line card, an exchange/control board, and an upstream board. The line card mainly provides functions such as interface protection, analog front end circuit processing, line digital signal processing, service scheduling, and forwarding. The exchange/control board mainly performs service data exchange, forwarding, and exchange/forwarding protocol processing, and the upstream board mainly provides a connection between the copper wire access device and a network-side device.

FIG. 2 is a schematic structural diagram of a box-type copper wire access device. The device includes a line card and an upstream board. The line card mainly provides interface protection, analog front end circuit processing, and line digital signal processing; and the upstream board mainly performs service scheduling and forwarding, and provides a connection to a network-side device.

FIG. 3 is a schematic structural diagram of an integrated copper wire access device. Functions such as interface protection, analog front end circuit processing, line digital signal processing, service scheduling and forwarding, and connecting to a network-side device are integrated into one physical entity.

It may be seen from the foregoing three types of copper wire access devices that, copper wire access devices of different structures all include three functional modules interface protection, analog front end circuit processing, and line digital signal processing. Each line digital signal processing device includes a line digital signal processing functional module, in addition, a processing process of the line digital signal processing functional module is complex, extra monitoring, maintenance, and alarm processing need to be performed on the line digital signal processing functional module, and operation and maintenance costs of line digital signal processing on each line processing device are relatively high, which causes high operation and maintenance costs of an entire communications network and cannot meet a requirement of today's users for reducing network costs.

SUMMARY

In view of this, embodiments of the present disclosure provide a line digital signal processing device and method, according to which, line digital signal processing can be performed on service data over multiple user access lines simultaneously and network operation and maintenance costs can be reduced.

A first aspect of the embodiments of the present disclosure provides a line digital signal processing device, where the device includes at least two line access modules and a data processing module, where the at least two line access modules are connected to the data processing module. The at least two line access modules are configured to provide interface protection, perform analog signal processing, analog-to-digital conversion, and service scheduling on received service data, and send the processed service data to the data processing module. The data processing module includes a first data encapsulating module, a first line digital signal processing module, a first service scheduling and forwarding module, a first exchanging/forwarding control module, and a first upstream module, where the first data encapsulating module is configured to receive the service data sent by the at least two line access modules, encapsulate the received service data, and send the encapsulated service data to the first line digital signal processing module, where the received service data includes service data of different access modes. The first line digital signal processing module is configured to perform line digital signal processing and service data recovery on the encapsulated service data, and send the processed service data to the first service scheduling and forwarding module, where different line digital signal processing methods are used for the service data of different access modes. The first service scheduling and forwarding module is configured to perform service scheduling on the processed service data and forward the service data obtained after the service scheduling to the first exchanging/forwarding control module. The first exchanging/forwarding control module is configured to forward the service data obtained after the service scheduling to the first upstream module, and the first upstream module is configured to send, in an upstream direction, the service data obtained after the service scheduling.

In a first possible implementation manner of the first aspect of the embodiments of the present disclosure, the device further includes a first standby exchanging/forwarding control module configured to forward the service data obtained after the service scheduling to the first upstream module when the first exchanging/forwarding control module is abnormal.

In a second possible implementation manner of the first aspect of the embodiments of the present disclosure, the device further includes a first standby line digital signal processing module configured to, when the first line digital signal processing module is abnormal, perform line digital signal processing and service data recovery on the received encapsulated service data, where different line digital signal processing methods are used for the service data of different access modes.

With reference to any one of the first aspect to the second possible implementation manner of the first aspect of the embodiments of the present disclosure, in a third possible implementation manner, each line access module includes an interface protection unit configured to provide interface protection, an analog signal processing unit configured to perform analog signal processing on the received service data, and send the service data obtained after the analog signal processing to an analog-to-digital conversion unit. The analog-to-digital conversion unit configured to perform analog-to-digital conversion on the service data obtained after the analog signal processing, and send the service data obtained after the analog-to-digital conversion to a third service scheduling and forwarding unit, and the third service scheduling and forwarding unit configured to perform service scheduling on the service data obtained after the analog-to-digital conversion, and send the service data obtained after the service scheduling to the data processing module.

A second aspect of the embodiments of the present disclosure provides a line digital signal processing system. The system includes a data access apparatus, a data preprocessing apparatus, and a line digital signal processing apparatus, where the data access apparatus includes at least two line access modules, where at least two line access modules are configured to provide interface protection, perform analog signal processing, analog-to-digital conversion, and service scheduling on received service data, and send the processed service data to the data preprocessing apparatus. The data preprocessing apparatus includes a second data encapsulating module, a second service scheduling module, a second exchanging/forwarding control module, and a second upstream module, where the second data encapsulating module is configured to receive the service data sent by the at least two line access modules, encapsulate the received service data, and send the encapsulated service data to the second service scheduling module, where the received service data includes service data of different access modes. The second service scheduling module is configured to perform service scheduling on the encapsulated service data and send the service data obtained after the service scheduling to the second exchanging/forwarding control module. The second exchanging/forwarding control module is configured to forward the service data obtained after the service scheduling to the second upstream module. The second upstream module is configured to send the service data obtained after the service scheduling to the line digital signal processing apparatus in an upstream direction, and the line digital signal processing apparatus includes a second line digital signal processing module, a second service scheduling and forwarding module, and a third upstream module, where the second line digital signal processing module is configured to perform line digital signal processing and service data recovery on the received encapsulated service data, and send the processed service data to the second service scheduling and forwarding module, where different line digital signal processing methods are used for the service data of different access modes. The second service scheduling and forwarding module is configured to perform service scheduling on the processed service data and send the service data obtained after the service scheduling to the third upstream module, and the third upstream module is configured to send the service data obtained after the service scheduling in an upstream direction.

In a first possible implementation manner of the second aspect of the embodiments of the present disclosure, the data preprocessing apparatus further includes a second standby exchanging/forwarding control module configured to forward the service data obtained after the service scheduling to the second upstream module when the second exchanging/forwarding control module is abnormal.

In a second possible implementation manner of the second aspect of the embodiments of the present disclosure, the line digital signal processing apparatus further includes, a second standby line digital signal processing module configured to, when the second line digital signal processing module is abnormal, perform line digital signal processing and service data recovery on the received encapsulated service data, where different line digital signal processing methods are used for the service data of different access modes.

With reference to any one of the second aspect to the second possible implementation manner of the second aspect of the embodiments of the present disclosure, in a third possible implementation manner, the data access apparatus is at least one optical network unit (ONU). The data preprocessing apparatus is an optical line terminal (OLT), and the line digital signal processing apparatus is a cloud server.

With reference to any one of the second aspect to the second possible implementation manner of the second aspect of the embodiments of the present disclosure, in a fourth possible implementation manner, the data access apparatus and the data preprocessing apparatus are a digital subscriber line access multiplexer (DSLAM), and the line digital signal processing apparatus is a cloud server.

A third aspect of the embodiments of the present disclosure provides a line digital signal processing method, where the method includes performing, by a line access module, analog signal processing, analog-to-digital conversion, and service scheduling on received service data, and sending the processed service data to a data processing module, receiving, by the data processing module, the service data sent by the at least two line access modules, and encapsulating the received service data, performing, by the data processing module, line digital signal processing and service data recovery on the encapsulated service data, performing, by the data processing module, service scheduling on the processed service data, and forwarding, by the data processing module, the service data obtained after the service scheduling, and sending the service data obtained after the service scheduling in an upstream direction.

A fourth aspect of the embodiments of the present disclosure provides a line digital signal processing method, where the method includes performing, by a data access apparatus, analog signal processing, analog-to-digital conversion, and service scheduling on received service data, and sending the processed service data to a data preprocessing apparatus, receiving, by the data preprocessing apparatus, the service data sent by the at least two line access modules, and encapsulating the received service data, performing, by the data preprocessing apparatus, service scheduling on the encapsulated service data, forwarding, by the data preprocessing apparatus, the service data obtained after the service scheduling, and sending the service data to a line digital signal processing apparatus in an upstream direction, performing, by the line digital signal processing apparatus, line digital signal processing and service data recovery on the received encapsulated service data, and performing, by the line digital signal processing apparatus, service scheduling on the processed service data and sending, in an upstream direction, the service data obtained after the service scheduling.

It may be known from the foregoing content that the present disclosure has the following benefits:

The embodiments of the present disclosure provide a line digital signal processing device and method, where the device includes at least two line access modules and a data processing module. The at least two line access modules are connected to the data processing module. The at least two line access modules are configured to provide interface protection, perform analog signal processing, analog-to-digital conversion, and service scheduling on received service data, and send the processed service data to the data processing module, and the data processing module is configured to receive the service data sent by the at least two line access modules, encapsulate the received service data, perform line digital signal processing and service data recovery on the encapsulated service data, and send the processed service data in an upstream direction, where the received service data includes service data of different access modes, and different line digital signal processing methods are used for the service data of different access modes. In the device provided in the embodiments of the present disclosure, each line access module is not provided with line digital signal processing, the at least two line access modules are connected to the data processing module, and the data processing module simultaneously performs line digital signal processing and service data recovery on the service data sent by the at least two line access modules, thereby reducing complexity of an access device. In addition, monitoring, maintenance, and alarming are simultaneously performed on complex line digital signal processing components, thereby reducing operation and maintenance costs of the device and improving a service data processing capability of the device.

BRIEF DESCRIPTION OF DRAWINGS

To describe the technical solutions in the embodiments of the present disclosure or in the prior art more clearly, the following briefly introduces the accompanying drawings required for describing the embodiments or the prior art. The accompanying drawings in the following description show merely some embodiments of the present disclosure, and a person of ordinary skill in the art may still derive other drawings from these accompanying drawings without creative efforts.

DESCRIPTION OF EMBODIMENTS

The following describes specific embodiments of the present disclosure in detail with reference to accompanying drawings.

Embodiment 1

Figure 1:
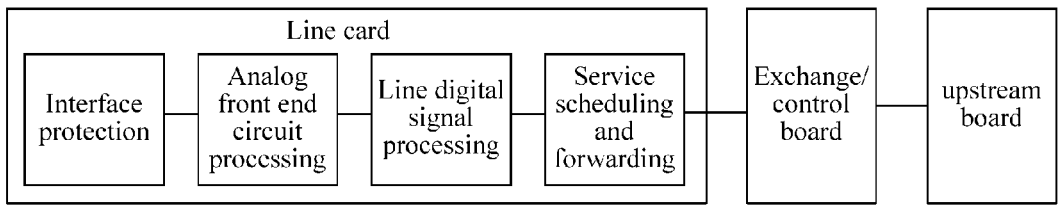
FIG. 1 is a schematic structural diagram of a frame-type copper wire access device.
Figure 2:
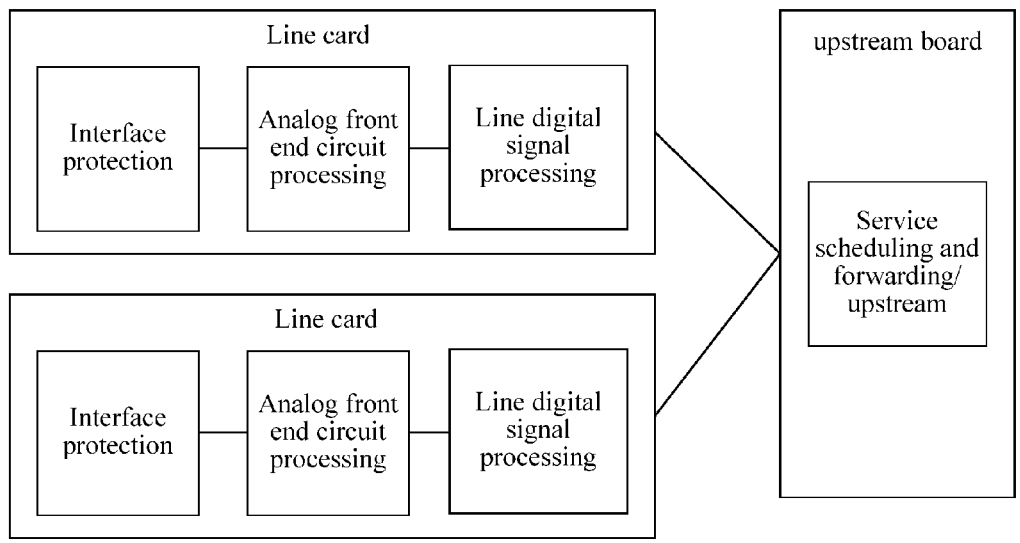
FIG. 2 is a schematic structural diagram of a box-type copper wire access device.
Figure 3:
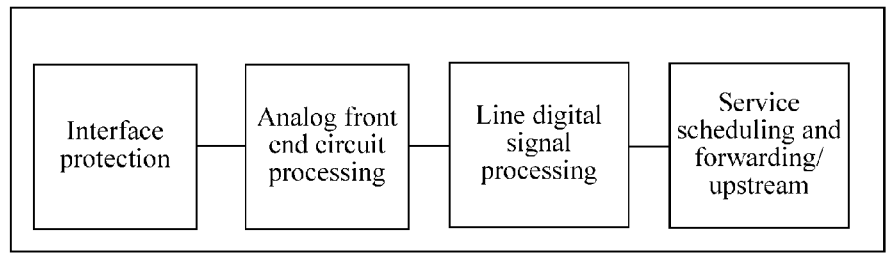
FIG. 3 is a schematic structural diagram of an integrated copper wire access device.
Figure 4:
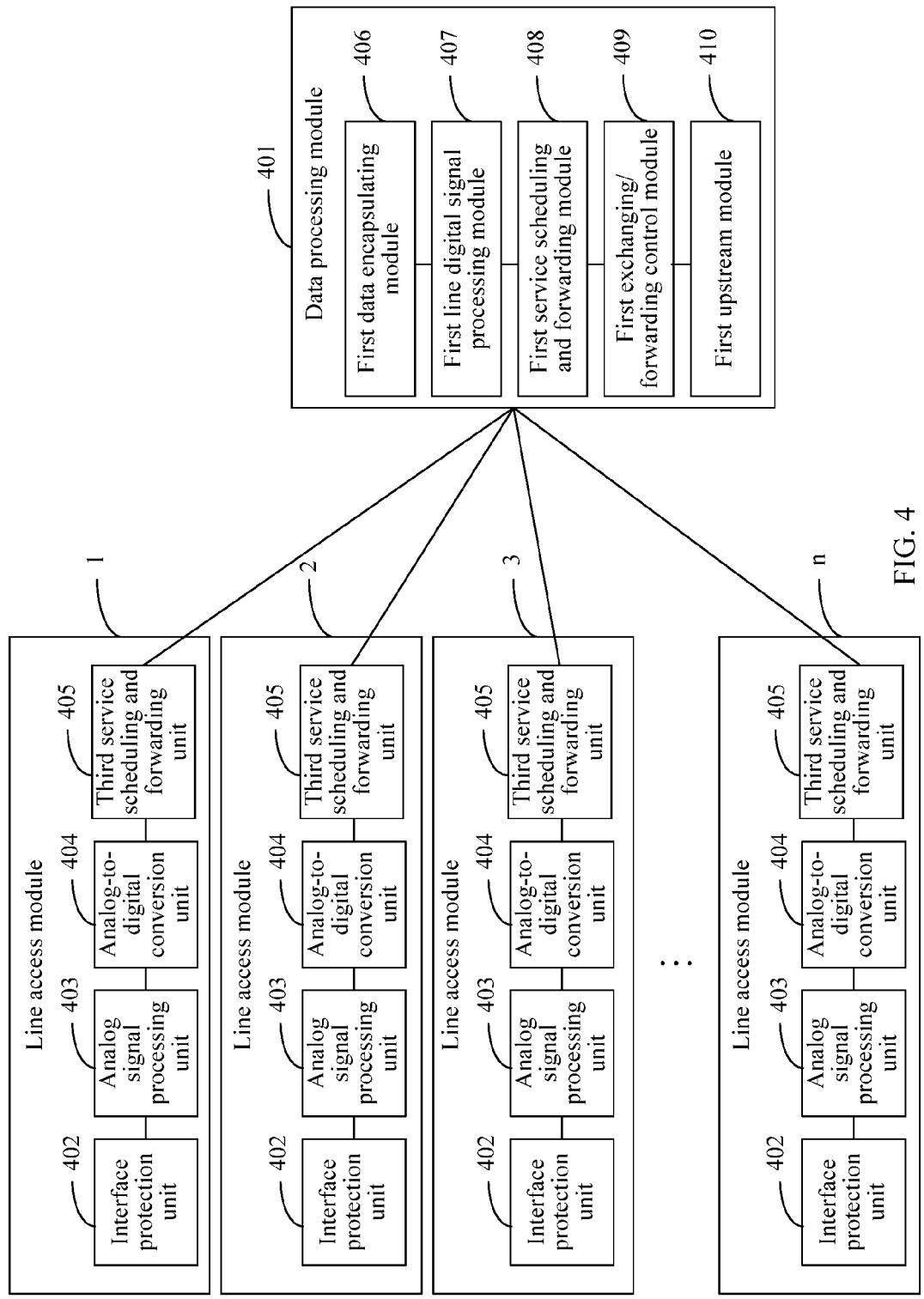
FIG. 4 is a schematic structural diagram of Embodiment 1 of a line digital signal processing device according to the present disclosure.

FIG. 4 is a schematic structural diagram of Embodiment 1 of a line digital signal processing device according to the present disclosure. The device includes at least two line access modules 1 to n and a data processing module 401, where the at least two line access modules are connected to the data processing module. Each line access module may be connected to the data processing module using an internal local area network or the external Internet, and n is a natural number greater than or equal to 2, and 1 to n line access modules are connected to the data processing module using the Ethernet or a passive optical network (PON).

The at least two line access modules are configured to provide interface protection, perform analog signal processing, analog-to-digital conversion, and service scheduling on received service data, and send the processed service data to the data processing module.

As shown in FIG. 4, each of the line access modules 1 to n includes an interface protection unit 402, an analog signal processing unit 403, an analog-to-digital conversion unit 404, and a third service scheduling and forwarding unit 405.

The interface protection unit 402 is configured to provide interface protection.

The interface protection unit 402 mainly protects the line access module from a lighting strike, static electricity, interference from other signals, and the like.

The analog signal processing unit 403 is configured to perform analog signal processing on received service data, and send the service data obtained after the analog signal processing to the analog-to-digital conversion unit 404.

In a specific implementation process, an analog signal processing circuit may be used to perform analog signal processing on the received service data.

The analog-to-digital conversion unit 404 is configured to perform analog-to-digital conversion on the service data obtained after the analog signal processing, and send the service data obtained after the analog-to-digital conversion to the third service scheduling and forwarding unit 405.

After the analog signal processing is performed on the service data, the service data of an analog signal is converted into the service data of a digital signal. The line access module does not provide a line digital signal processing function. Therefore, the line access module does not perform line digital signal processing on the service data that is converted into the service data of a digital signal.

The third service scheduling and forwarding unit 405 is configured to perform service scheduling on the service data obtained after the analog-to-digital conversion, and send the service data obtained after the service scheduling to the data processing module 401.

Performing service scheduling on the service data obtained after the analog-to-digital conversion mainly refers to sequencing, according to priorities of the service data, the service data obtained after the analog-to-digital conversion, and outputting higher-priority service data first, and then outputting lower-priority service data. Certainly, the service scheduling manner is not limited to the foregoing service scheduling manner, and other service scheduling manners may also be used.

After the service scheduling is performed on service data of each line access module, the service data obtained after the service scheduling is sent to the data processing module using the Ethernet or the PON, that is, the data processing module receives the service data sent by the line access modules 1 to n.

The line access module may use different access modes such as POTS, ADSL, VDSL, VDSL vectoring, and G.fast to connect to a subscriber line, and when different modes are used by the line access module to connect to the subscriber line, data formats of the received service data are different. Therefore, the data formats of service data, sent by the line access modules that are connected to the subscriber line using different access modes, received by the data processing module are different.

The data processing module 401 includes a first data encapsulating module 406, a first line digital signal processing module 407, a first service scheduling and forwarding module 408, a first exchanging/forwarding control module 409, and a first upstream module 410, which are connected to each other in sequence.

The first data encapsulating module 406 is configured to receive the service data sent by the at least two line access modules, encapsulate the received service data, and send the encapsulated service data to the first line digital signal processing module 407, where the received service data includes service data of different access modes.

The first data encapsulating module 406 is configured to encapsulate the service data, sent by the at least two line access modules, into a data packet, where the service data included in the data packet may include service data of different access modes.

The first line digital signal processing module 407 is configured to perform line digital signal processing and service data recovery on the encapsulated service data, and send the processed service data to the first service scheduling and forwarding module 408, where different line digital signal processing methods are used for the service data of different access modes.

The first line digital signal processing module 407 simultaneously performs line digital signal processing and service data recovery on all service data in the data packet and because the service data in the data packet may be service data obtained in different access modes, corresponding line digital signal processing methods are used for the service data of different access modes.

The first service scheduling and forwarding module 408 is configured to perform service scheduling on the processed service data and forward the service data obtained after the service scheduling to the first exchanging/forwarding control module 409.

After the line digital signal processing and service data recovery are performed on the service data in the data packet, the service data is sequenced according to priories of the service data, and higher-priority service data (such as voice data) is arranged in front, and lower priority service data (such as packet data) is arranged behind.

The first exchanging/forwarding control module 409 is configured to forward the service data obtained after the service scheduling to the first upstream module 410.

The first upstream module 410 is configured to send, in an upstream direction, the service data obtained after the service scheduling.

After the scheduling is performed on the service data in the data packet obtained after the line digital signal processing, the scheduled service data is sent by the first upstream module 410 in the upstream direction for subsequent service processing.

Optionally, the apparatus further includes a first standby exchanging/forwarding control module configured to forward the service data obtained after the service scheduling to the first upstream module 410 when the first exchanging/forwarding control module 409 is abnormal.

The function of the first standby exchanging/forwarding control module is the same as that of the first exchanging/forwarding control module 409. When the first exchanging/forwarding control module 409 is faulty, the standby exchanging/forwarding control module is used to forward the service data obtained after the service scheduling to the first upstream module.

Optionally, the apparatus further includes a first standby line digital signal processing module configured to, when the first line digital signal processing module 407 is abnormal, perform line digital signal processing and service data recovery on the received encapsulated service data, where different line digital signal processing methods are used for the service data of different access modes.

The function of the first standby line digital signal processing module is the same as that of the first line digital signal processing module 407. When the first line digital signal processing module 407 is faulty, the first standby line digital signal processing module performs line digital signal processing and service data recovery instead of the first line digital signal processing module 407 on the service data.

The data processing module 401 may simultaneously process multiple pieces of service data sent by multiple line access modules, and may process, in sequence, service data that is sent by the line access modules at different moments. Because each piece of service data carries a destination identifier, after performing line digital signal processing on the service data, the data processing module 401 schedules and forwards the processed service data according to the destination identifier of each piece of service data, and send the service data to a destination in an upstream direction.

It may be known from the foregoing content that the present disclosure has the following benefits.

This embodiment of the present disclosure provides a line digital signal processing device. In the device provided in this embodiment of the present disclosure, each line access module is not provided with line digital signal processing, at least two line access modules are connected to a data processing module, and the data processing module simultaneously performs line digital signal processing and service data recovery on service data sent by the at least two line access modules, thereby reducing complexity of an access device. In addition, monitoring, maintenance, and alarming are simultaneously performed on complex line digital signal processing components, thereby reducing operation and maintenance costs of the device and improving a service data processing capability of the device.

Embodiment 2

In Embodiment 2, a hardware implementation structure of the line digital signal processing device in Embodiment 1 is described in detail. The device has two possible hardware implementation structures.

In a first possible hardware implementation structure, the line digital signal processing device includes at least two ONUs and one OLT. A line card of each ONU is integrated with one line access module in Embodiment 1, and the ONU is integrated with the functions of the line access module, includes an interface protection unit, an analog signal processing unit, an analog-to-digital conversion unit, and a third service scheduling and forwarding unit, and is configured to provide interface protection, perform analog signal processing, analog-to-digital conversion, and service scheduling on received service data, and send the processed service data to the OLT.

The OLT is integrated with the data processing module 401 in Embodiment 1, and there are two possible implementation manners.

In a first possible manner, a PON line card or an Ethernet line card in the OLT is integrated with the first data encapsulating module, the first line digital signal processing module, and the first service scheduling and forwarding module in the data processing module in Embodiment 1. An exchanging/forwarding controller in the OLT is integrated with the first exchanging/forwarding control module in the data processing module in Embodiment 1, and an upstream interface in the OLT is integrated with the first upstream module in the data processing module in Embodiment 1.

In a second possible manner a PON line card or an Ethernet line card in the OLT is integrated with the first data encapsulating module in the data processing module in Embodiment 1. A line digital signal processing resource board in the OLT is integrated with the first data encapsulating module, the first line digital signal processing module, and the first service scheduling and forwarding module in the data processing module in Embodiment 1. An exchanging/forwarding controller in the OLT is integrated with the first exchanging/forwarding control module in the data processing module in Embodiment 1, and an upstream interface of the OLT is integrated with the first upstream module in the data processing module in Embodiment 1.

The OLT implements the functions of the data processing module in Embodiment 1, and is configured to receive the service data sent by the at least two data access modules, encapsulate the received service data, perform line digital signal processing and service data recovery on the encapsulated service data, and send the processed service data in an upstream direction, where the received service data includes the service data of different access modes, and different line digital signal processing methods are used for the service data of different access modes.

Optionally, a standby exchanging/forwarding controller may be set in the OLT. When the exchanging/forwarding controller is faulty, the standby exchanging/forwarding controller is used.

In a second possible hardware implementation structure the line digital signal processing device is a DSLAM. Each line card in a DSLAM is integrated with one line access module in Embodiment 1, and the line card in the DSLAM is integrated with the functions of the line access module, includes an interface protection module, an analog signal processing module, an analog-to-digital conversion module, and a service scheduling and forwarding module, and is configured to provide interface protection, perform analog signal processing, analog-to-digital conversion, and service scheduling on received service data, and send the processed service data to the data processing module.

The DSLAM is integrated with the data processing module 401 in Embodiment 1, and there are two possible implementation manners.

In a first possible implementation manner a PON line card or an Ethernet line card in the DSLAM is integrated with the first data encapsulating module, the first line digital signal processing module, and the first service scheduling and forwarding module in the data processing module in Embodiment 1. An exchanging/forwarding controller in the DSLAM is integrated with the first exchanging/forwarding control module in the data processing module in Embodiment 1, and an upstream interface of the DSLAM is integrated with the first upstream module in the data processing module in Embodiment 1.

In a second possible implementation manner a PON line card or an Ethernet line card in the DSLAM is integrated with the first data encapsulating module in the data processing module in Embodiment 1, a line digital signal processing resource board of the DSLAM is integrated with the first line digital signal processing module and the first service scheduling and forwarding module in the data processing module in Embodiment 1. An exchanging/forwarding controller in the DSLAM is integrated with the first exchanging/forwarding control module in the data processing module in Embodiment 1, and an upstream interface of the DSLAM is integrated with the first upstream module in the data processing module in Embodiment 1.

Optionally, a standby exchanging/forwarding controller may be set in the DSLAM. When the exchanging/forwarding controller is faulty, the standby exchanging/forwarding controller is used.

Embodiment 3

Figure 5:
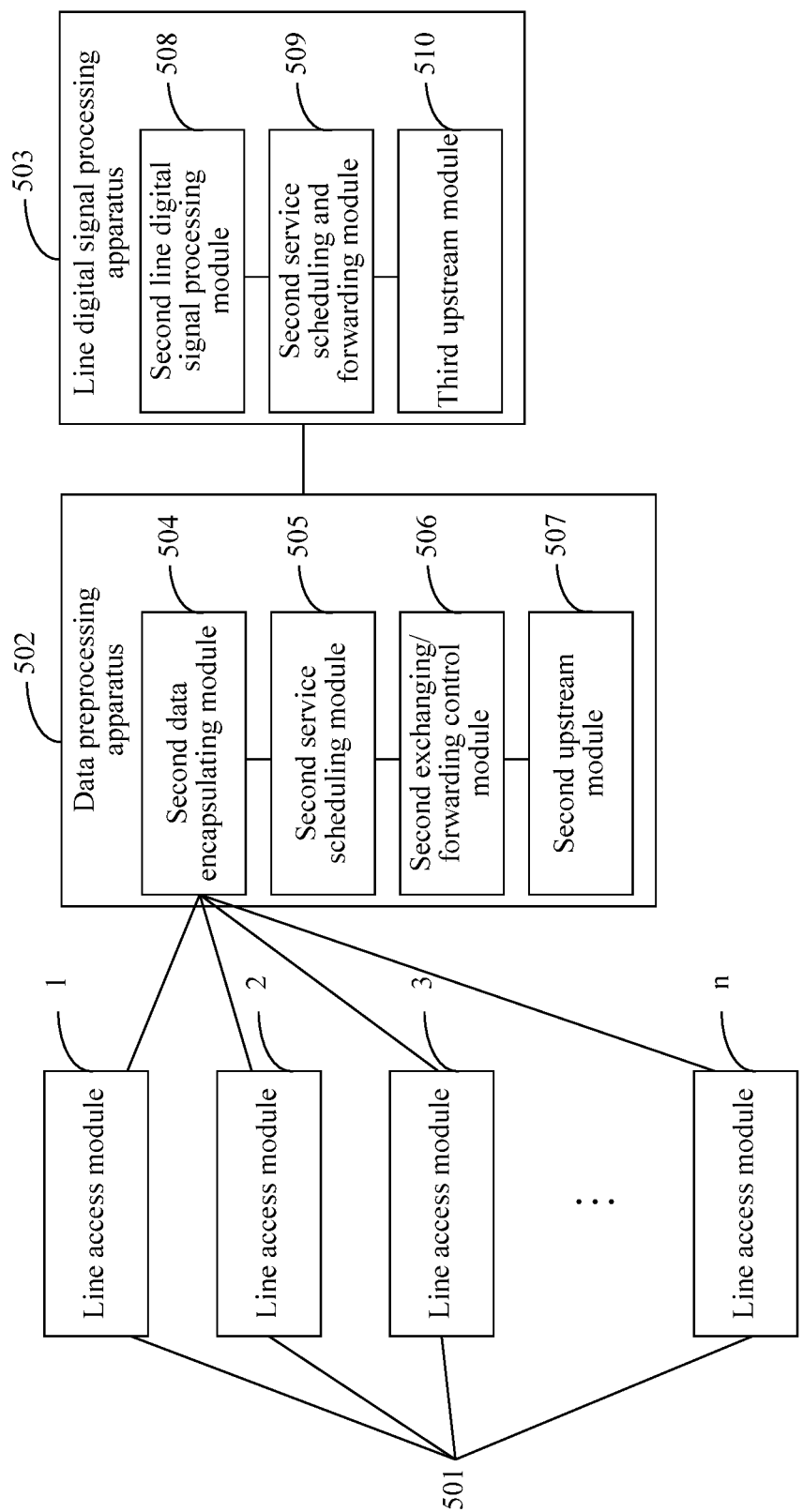
FIG. 5 is a schematic structural diagram of Embodiment 3 of a line digital signal processing system according to the present disclosure.

FIG. 5 is a schematic structural diagram of Embodiment 3 of a line digital signal processing system according to the present disclosure. The system includes a data access apparatus 501, a data preprocessing apparatus 502, and a line digital signal processing apparatus 503.

The data access apparatus 501 includes at least two line access modules 1 to n, and the at least two line access modules 1 to n are connected to the data preprocessing apparatus 502.

The at least two line access modules 1 to n are configured to provide interface protection, perform analog signal processing, analog-to-digital conversion, and service scheduling on received service data, and send the processed service data to the data preprocessing apparatus 502.

The foregoing is similar to Embodiment 1, and for details, refer to the description in Embodiment 1, and no further details are provided herein again.

The data preprocessing apparatus 502 includes a second data encapsulating module 504, a second service scheduling module 505, a second exchanging/forwarding control module 506, and a second upstream module 507, which are connected to each other in sequence.

The second data encapsulating module 504 is configured to receive service data sent by the at least two line access modules, encapsulate the received service data, and send the encapsulated service data to the second service scheduling module 505, where the received service data includes service data of different access modes.

The second service scheduling module 505 is configured to perform service scheduling on the encapsulated service data and send the service data obtained after the service scheduling to the second exchanging/forwarding control module 506.

The second exchanging/forwarding control module 506 is configured to forward the service data obtained after the service scheduling to the second upstream module 507.

The second upstream module 507 is configured to send the service data obtained after the service scheduling to the line digital signal processing apparatus 503 in an upstream direction.

The line digital signal processing apparatus 503 includes a second line digital signal processing module 508, a second service scheduling and forwarding module 509, and a third upstream module 510, which are connected to each other in sequence.

The second line digital signal processing module 508 is configured to perform line digital signal processing and service data recovery on the received encapsulated service data, and send the processed service data to the second service scheduling and forwarding module 509, where different line digital signal processing methods are used for the service data of different access modes.

The second service scheduling and forwarding module 509 is configured to perform service scheduling on the processed service data and send the service data obtained after the service scheduling to the third upstream module 510.

The third upstream module 510 is configured to send the service data obtained after the service scheduling in an upstream direction.

Optionally, the data preprocessing apparatus 502 further includes a second standby exchanging/forwarding control module configured to forward the service data obtained after the service scheduling to the second upstream module when the second exchanging/forwarding control module 506 is abnormal.

The function of the standby exchanging/forwarding control module is the same as that of the second exchanging/forwarding control module 506. When the second exchanging/forwarding control module 506 is faulty, the standby exchanging/forwarding control module is used to forward the service data obtained after the service scheduling to the second upstream module 507.

Optionally, the line digital signal processing apparatus 503 further includes a second standby line digital signal processing module configured to, when the second line digital signal processing module 508 is abnormal, perform line digital signal processing and service data recovery on the received encapsulated service data, where different line digital signal processing methods are used for the service data of different access modes.

Embodiment 4

In Embodiment 4, a hardware implementation structure of a line digital signal processing system is described in detail. The system has two possible hardware implementation structures.

Figure 6:
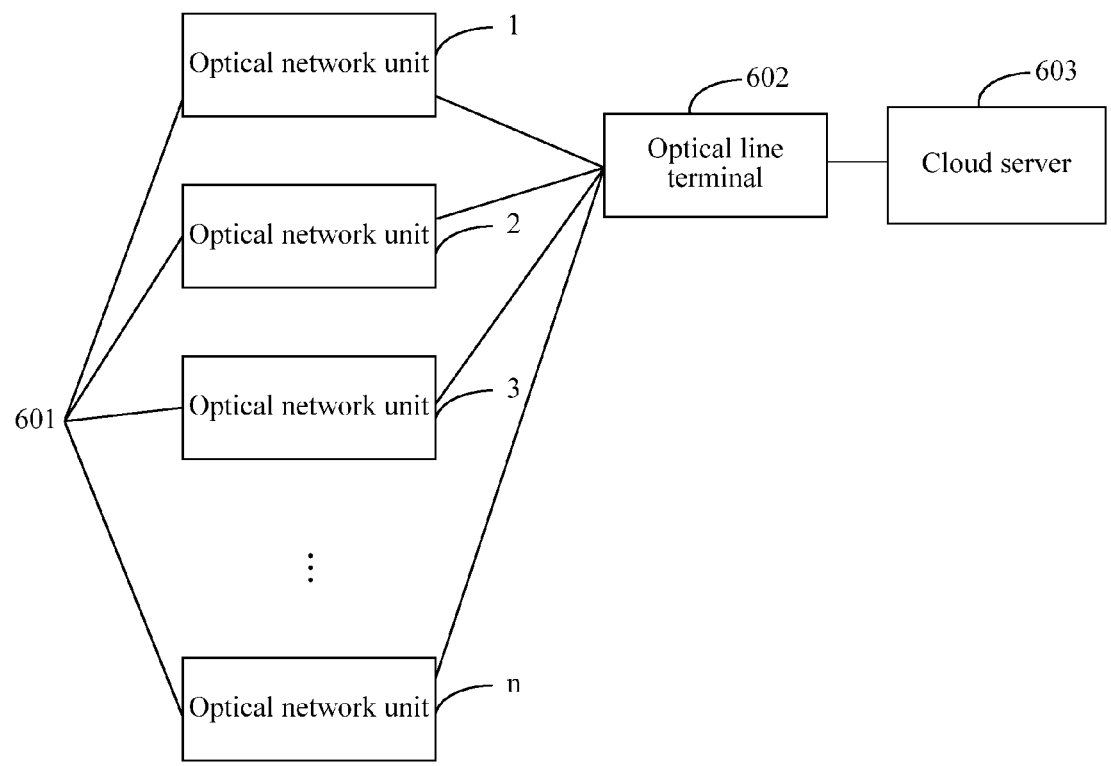
FIG. 6 is a first schematic hardware structural diagram of Embodiment 4 of a line digital signal processing system according to the present disclosure.

FIG. 6 is a first schematic hardware structural diagram of Embodiment 4 of a line digital signal processing system according to the present disclosure. In a first possible hardware implementation structure the data access apparatus 501 is at least one ONU 601. The data preprocessing apparatus 502 is an OLT 602, and the line digital signal processing apparatus 503 is a cloud server 603.

Each ONU is integrated with one line access module of the data access apparatus in Embodiment 3.

Each ONU is configured to provide interface protection, perform analog signal processing, analog-to-digital conversion, and service scheduling on received service data, and send the processed service data to the OLT.

The OLT is integrated with the second data encapsulating module, the second service scheduling module, the second exchanging/forwarding control module, and the second upstream module in the data preprocessing apparatus in Embodiment 3.

Optionally, a standby exchanging/forwarding control module may be integrated into the OLT. When the second exchanging/forwarding control module is faulty, the standby exchanging/forwarding control module is used.

The OLT is configured to receive the service data sent by the at least two line access modules, encapsulate the received service data; perform service scheduling on the encapsulated service data, and forward the service data obtained after the service scheduling to the cloud server in an upstream direction.

The cloud server is integrated with the second line digital signal processing module, the second service scheduling and forwarding module, and the third upstream module in the line digital signal processing apparatus in Embodiment 3.

Figure 7:
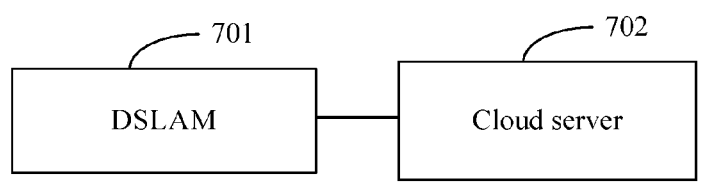
FIG. 7 is a second schematic hardware structural diagram of Embodiment 4 of the line digital signal processing system according to the present disclosure.

FIG. 7 is a second schematic hardware structural diagram of Embodiment 4 of the line digital signal processing system according to the present disclosure. In a second possible hardware implementation structure the data access apparatus 501 and the data preprocessing apparatus 502 are a DSLAM 701, and the line digital signal processing apparatus 503 is a cloud server 702.

The DSLAM 701 is integrated with at least one line access module in the data access apparatus 501, and the second data encapsulating module, the second service scheduling module, the second exchanging/forwarding control module, and the second upstream module in the data preprocessing module 502.

Optionally, a second standby line digital signal processing module may be further integrated into the cloud server 702. When the second line digital signal processing module is faulty, the second standby line digital signal processing module is used.

After the cloud server 702 simultaneously performs line digital signal processing and service data recovery on service data, of multiple subscriber lines, received by the OLT, and service scheduling on the processed service data, the cloud server sends, in an upstream direction, the service obtained after the service scheduling, for subsequent processing.

The second line digital signal processing module is located in the cloud server 702, and the second line digital signal processing module may simultaneously perform line digital signal processing and service data recovery on the multiple pieces of service data received by the OLT. Compared with performing line digital signal processing on service data on a client, the second line digital signal processing module can simultaneously perform line digital signal processing on more pieces of service data.

Embodiment 5

Figure 8:
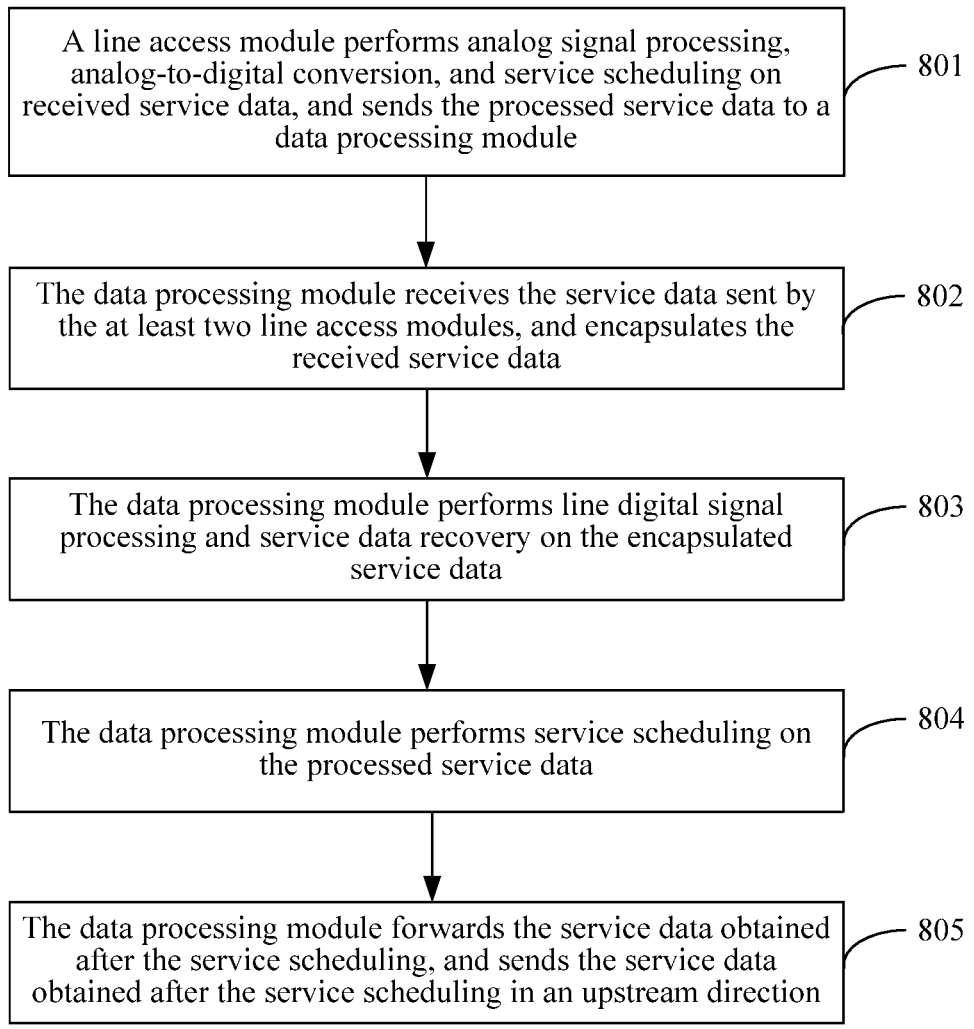
FIG. 8 is a flowchart of Embodiment 5 of a line digital signal processing system according to the present disclosure.

FIG. 8 is a flowchart of Embodiment 5 of a line digital signal processing method according to the present disclosure, which is a method corresponding to the device described in Embodiment 1. The method includes the following steps.

Step 801: A line access module performs analog signal processing, analog-to-digital conversion, and service scheduling on received service data, and sends the processed service data to a data processing module.

Step 802: The data processing module receives the service data sent by the at least two line access modules, and encapsulates the received service data.

Step 803: The data processing module performs line digital signal processing and service data recovery on the encapsulated service data.

Step 804: The data processing module performs service scheduling on the processed service data.

Step 805: The data processing module forwards the service data obtained after the service scheduling, and sends the service data obtained after the service scheduling in an upstream direction.

Embodiment 6

Figure 9:
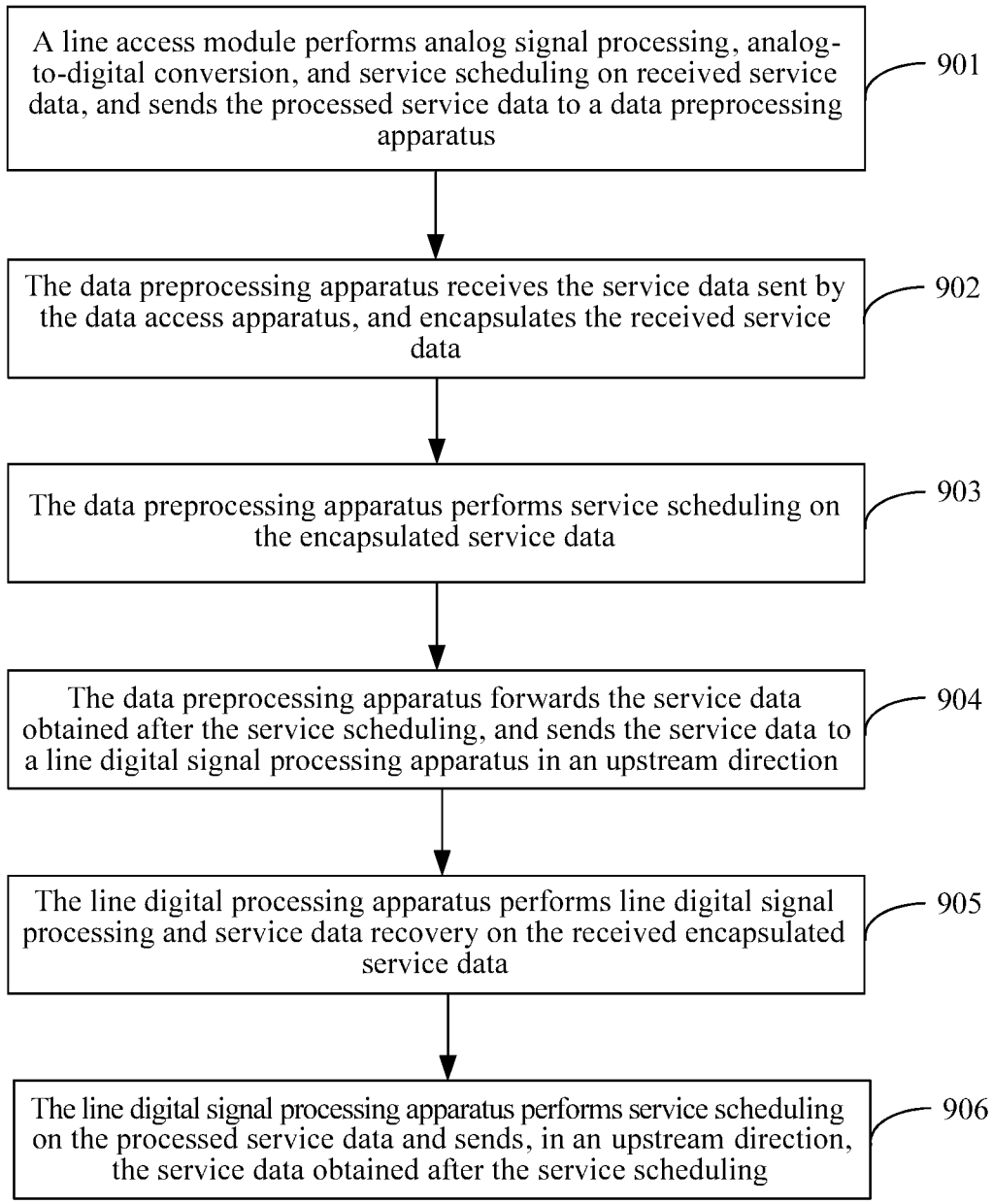
FIG. 9 is a flowchart of Embodiment 6 of a line digital signal processing system according to the present disclosure.

FIG. 9 is a flowchart of Embodiment 6 of a line digital signal processing method according to the present disclosure, which is a method corresponding to the system described in Embodiment 3. The method includes the following steps.

Step 901: A line access module performs analog signal processing, analog-to-digital conversion, and service scheduling on received service data, and sends the processed service data to a data preprocessing apparatus.

Step 902: The data preprocessing apparatus receives the service data sent by the data access apparatus, and encapsulates the received service data.

Step 903: The data preprocessing apparatus performs service scheduling on the encapsulated service data.

Step 904: The data preprocessing apparatus forwards the service data obtained after the service scheduling, and sends the service data to a line digital signal processing apparatus in an upstream direction.

Step 905: The line digital signal processing apparatus performs line digital signal processing and service data recovery on the received encapsulated service data.

Step 906: The line digital signal processing apparatus performs service scheduling on the processed service data and sends, in an upstream direction, the service data obtained after the service scheduling.

The foregoing descriptions are merely exemplary embodiments of the present disclosure, but are not intended to limit the present disclosure. Any modification, equivalent replacement, or improvement made without departing from the spirit and principle of the present disclosure should fall within the protection scope of the present disclosure.

What is claimed is:

1. A line digital signal processing system, comprising:
at least two line accessors; and
a data processor,
wherein each of the at least two line accessors are coupled to the data processor,
wherein each of the at least two line accessors comprises:
an interface configured to provide interface protection;
an analog signal processor configured to perform analog signal processing on received service data;
an analog-to-digital converter configured to perform analog-to-digital conversion on the received service data subsequent to analog signal processing; and
a line accessor scheduler configured to:
perform service scheduling on the converted service data comprising a conversion of the received service data; and
send the converted service data to the data processor after the received service data undergoes analog signal processing, analog-to-digital conversion, and service scheduling without performing line digital signal processing on the converted service data, and wherein the interface, the analog signal processor, the analog-to-digital signal converter and the line accessor scheduler are coupled via a bus,
wherein the data processor comprises:
a first data encapsulator;
a first line digital signal processor coupled to the first data encapsulator;
a first service scheduler and forwarder coupled to the first line digital signal processor;
a first forwarding controller coupled to the first service scheduler and forwarder; and
a first upstreamer coupled to the first forwarding controller,
wherein the first data encapsulator is configured to:
receive the converted service data sent by the at least two line accessors;
encapsulate the converted service data; and
send encapsulated service data to the first line digital signal processor, wherein the encapsulated service data comprises at least a first data type of a first access mode and a second data type of a second access mode,
wherein the first line digital signal processor is configured to:
perform line digital signal processing on the encapsulated service data; and
send processed service data to the first service scheduler and forwarder, wherein a first digital signal processing method is used on the first data type and a second digital signal processing method is used on the second data type,
wherein the first service scheduler and forwarder is configured to:
schedule transmission of the processed service data; and
forward the processed service data to the first forwarding controller,
wherein the first forwarding controller is configured to forward the encapsulated service data to the first upstreamer, and
wherein the first upstreamer is configured to send, in an upstream direction, the encapsulated service data.

2. The system of claim 1, wherein the data processor further comprises a second forwarding controller coupled to the first service scheduler and forwarder and configured to forward the encapsulated service data obtained when the first forwarding controller malfunctions.

3. The system of claim 1, wherein the data processor further comprises a second line digital signal processor coupled to the first data encapsulator and configured to perform line digital signal processing on the encapsulated service data when the first line digital signal malfunctions.

4. A line digital signal processing system, comprising:
a data access apparatus comprising a line accessor;
a data preprocessing apparatus coupled to the data access apparatus; and
a line digital signal processing apparatus coupled to the data preprocessing apparatus, wherein the line accessor comprises:
an interface configured to provide interface protection;
an analog signal processor configured to perform analog signal processing, wherein the analog signal processor is coupled to the interface;
an analog-to-digital converter configured to perform analog-to-digital conversion on received service data, wherein the analog-to-digital converter is coupled to the analog signal processor;

a line accessor scheduler configured to:
perform service scheduling on converted service data comprising a conversion of the received service data; and
send the converted service data to the data preprocessing apparatus without performing line digital signal processing on the converted service data, wherein the line accessor scheduler is coupled to the analog-to-digital converter,
wherein the data preprocessing apparatus comprises:
a first data encapsulator;
a first service scheduler coupled to the first data encapsulator;
a first forwarding controller coupled to the second service scheduler; and
a first upstreamer coupled to the first forwarding controller,
wherein the first data encapsulator is configured to:
receive the converted service data from the line accessor;
encapsulate the converted service data; and
send the encapsulated service data to the first service scheduler,
wherein the first service scheduler is configured to:
perform service scheduling on the encapsulated service data; and
send the encapsulated service to the first forwarding controller,
wherein the first forwarding controller is configured to forward the encapsulated service data to the first upstreamer,
wherein the first upstreamer is configured to send the encapsulated service data to the line digital signal processing apparatus in an upstream direction without performing line digital signal processing on the encapsulated service data,
wherein the line digital signal processing apparatus comprises:
a first line digital signal processor;
a second service scheduler coupled to the first line digital signal processor; and
a second upstreamer coupled to the second service scheduler,
wherein the first line digital signal processor is configured to:
perform line digital signal processing on the encapsulated service data received from the data preprocessing apparatus; and
send processed service data to the second service scheduler,
wherein the second service scheduler is configured to:
perform service scheduling on the processed service data; and
send the processed service data to the second upstreamer,
wherein the second upstreamer is configured to send the processed service data in the upstream direction.

5. The system of claim 4, wherein the data preprocessing apparatus further comprises a second forwarding controller coupled to the first service scheduler and configured to forward the encapsulated service data to the first upstreamer when the first forwarding controller malfunctions.

6. The system of claim 4, wherein the line digital signal processing apparatus further comprises a second line digital signal processor coupled to the second service scheduler and configured to perform line digital signal processing on the encapsulated service data when the first line digital signal processor malfunctions.

7. The system of claim 4, wherein the data access apparatus is an optical network unit (ONU), wherein the data preprocessing apparatus is an optical line terminal (OLT), and wherein the line digital signal processing apparatus is a cloud server.

8. The system of claim 4, wherein the data access apparatus and the data preprocessing apparatus are a digital subscriber line access multiplexer (DSLAM), and wherein the line digital signal processing apparatus is a cloud server.

9. A line digital signal processing method, comprising:
performing, by a line accessor, analog signal processing on analog service data;
performing, by the line accessor, analog-to-digital conversion on the analog service data;
scheduling, by the line accessor, transmission of digital service data comprising a conversion of the analog service data;
sending, by the line accessor, the digital service data comprising the conversion of the analog service to a data processor without performing line digital signal processing on the digital service data;
receiving, by the data processor, the digital service data sent by the line accessors;
encapsulating, by the data processor, the digital service data;
performing, by the data processor, line digital signal processing on encapsulated service data comprising the digital service data;
performing, by the data processor, scheduling of the processed service data comprising the encapsulated service data;
forwarding, by the data processor, the processed service data; and
sending, by the data processor, the processed service data in an upstream direction.

10. A line digital signal processing method, comprising:
performing, by a data access apparatus, analog signal processing, analog-to-digital conversion, and service scheduling on analog service data;
sending, by the data access apparatus, digital service data comprising a conversion of the analog service data to a data preprocessing apparatus without performing line digital signal processing on the digital service data;
receiving, by the data preprocessing apparatus, the digital service data from the data access apparatus;
encapsulating, by the data preprocessing apparatus, the digital service data;
performing, by the data preprocessing apparatus, service scheduling on the encapsulated service data comprising the digital service data;
forwarding, by the data preprocessing apparatus, the encapsulated service data service scheduling;
sending, by the data preprocessing apparatus, the encapsulated service data to a line digital signal processing apparatus in an upstream direction without performing line digital signal processing on the encapsulated service data;
performing, by the line digital signal processing apparatus, line digital signal processing on the encapsulated service data;
performing, by the line digital signal processing apparatus, service scheduling on the processed service data comprising the encapsulated service data; and sending, by the line digital signal processing apparatus, in an upstream direction, the processed service data.

\* \* \* \* \*